Jan. 16, 1951

G. H. RUSSELL ET AL 2,538,473

DOLLY TYPE ADJUSTABLE MACHINE

Filed Feb. 19, 1947

Inventor

George H. Russell
William D. Mills

By *Clarence A. O'Brien
and Harvey B. Jacobson*
Attorneys

Patented Jan. 16, 1951

2,538,473

UNITED STATES PATENT OFFICE 2,538,473

DOLLY TYPE ADJUSTABLE MACHINE

George H. Russell and William D. Mills,
Reno, Nev.

Application February 19, 1947, Serial No. 729,608

7 Claims. (Cl. 214—1)

This invention relates to improvements in portable dolly type adjustable machines for use in changing heavy truck tires and wheels, and the like.

An object of the invention is to provide an improved wheel supported portable dolly type adjustable machine for lifting and supporting heavy truck tires when the same are being put on or removed from the wheels of a truck.

Another object of the invention is to provide an improved wheel supported dolly type adjustable machine having a substantially rectangular frame upon which a pair of transversely adjustable cam or lever actuated tire supporting arms or members are slidably mounted for supporting and elevating heavy tires and wheels of various sizes.

A further object of the invention is to provide an improved wheel supported dolly type adjustable machine having a substantially rectangular shaped frame upon which a pair of laterally adjustable cam or lever actuated tire supporting and elevating heavy truck tires of various sizes, together with slidable interlocking socket members disposed upon said frame adapted to adjustably and selectively support a plurality of removable tire positioning and supporting tubular pipes or supports.

Another object of the invention is to provide an improved dolly type adjustable machine for use in putting on and removing heavy truck tires and wheels, which will be highly efficient in operation and relatively inexpensive to manufacture and produce.

Other objects will appear as the description proceeds.

In the accompanying drawings which form a part of this application,

Like characters of reference are used throughout the following specification and the accompanying drawings to designate corresponding parts.

Figure 1:
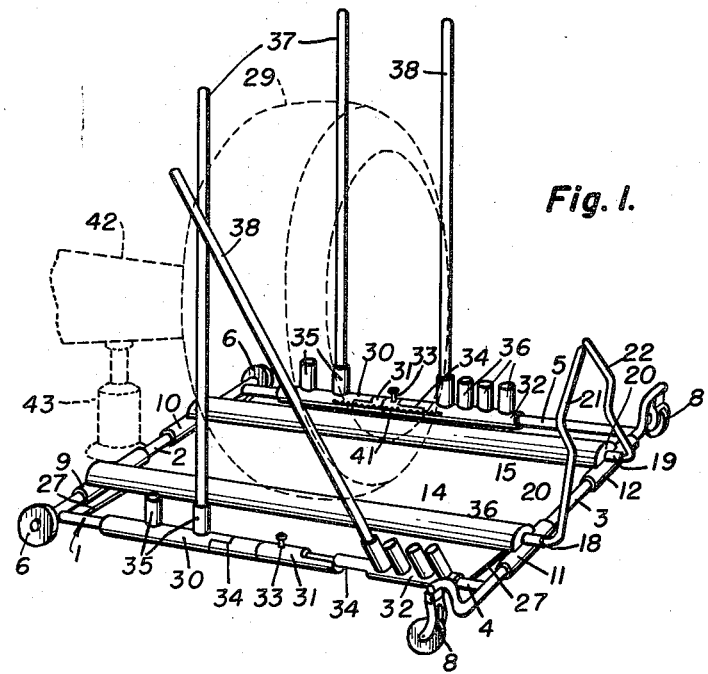
Figure 1 is a perspective view of the improved dolly type adjustable machine.
Figure 2:
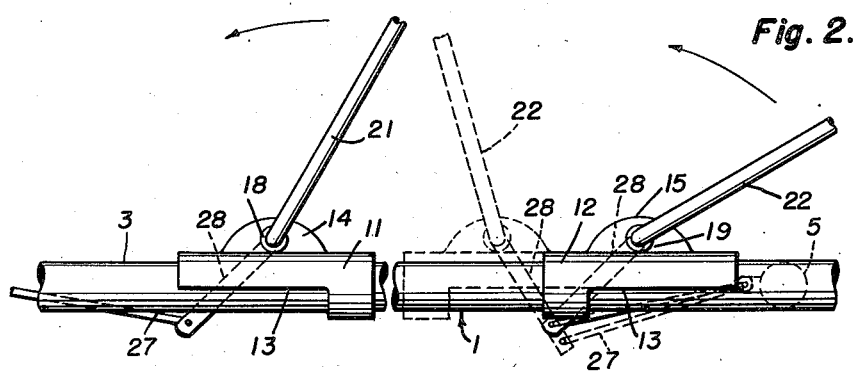
Figure 2 is a partial end elevation of the machine frame showing the cam or lever actuated tire supporting arms or members slidably mounted thereon.

In carrying out the invention, there is provided an improved form of dolly type adjustable machine including a substantially rectangular shaped frame generally denoted by the reference numeral 1 having oppositely disposed parallel front and rear tubular frame members 2 and 3, and oppositely disposed parallel side tubular frame members 4 and 5 connected between said members 2 and 3, being preferably welded together to form said frame or body 1.

The opposite ends of the front tubular frame member 2 are extended laterally of the side tubular frame members 4 and 5 and support the rotatable wheels or castors 6, while the opposite ends of the rear tubular frame members 3 are extended laterally of the side frame members 4 and 5, being bent upwardly and outwardly as at 7 to support the rotatable fork supported wheels or castors 8, thereby providing a portable wheel supported frame or body for the machine.

Oppositely disposed pairs of tubular guide members 9 and 10, and 11 and 12 are slidably mounted for transverse movement upon the front and rear tubular frame members 2 and 3 respectively, with the under and outer portions of said guide members being cut away as at 13.

Figure 3:
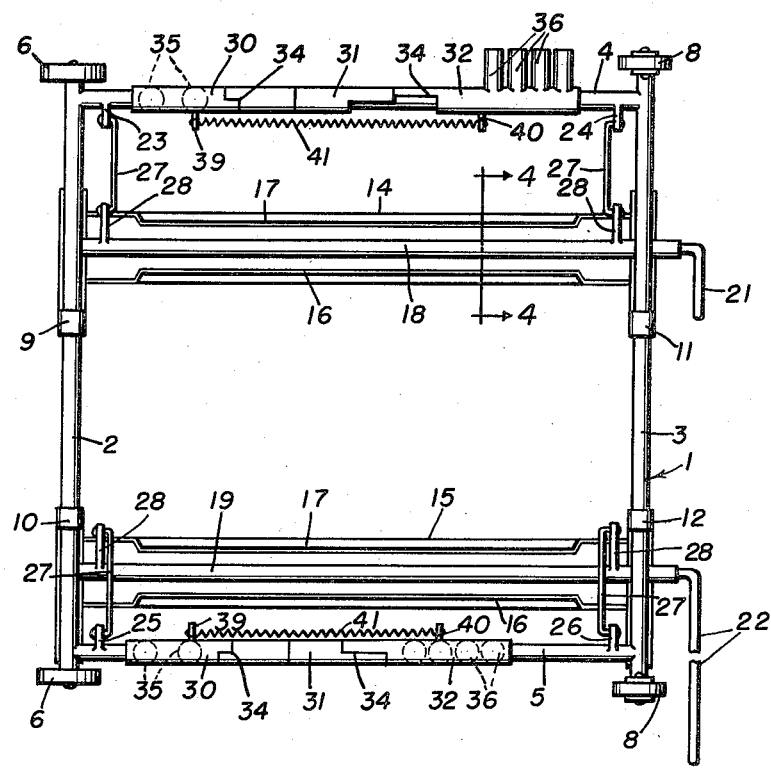
Figure 3 is a bottom plan view of the improved dolly type adjustable machine.
Figure 4:
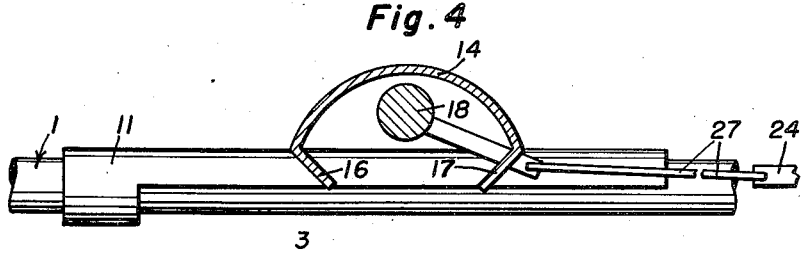
Figure 4 is a sectional view taken on the line 4—4 of Figure 3.

A pair of inverted U-shaped hollow lift arms or members 14 and 15 are disposed between the tubular guide members 9 and 11, and 10 and 12, respectively, and are suitably attached thereto as by welding or in any other desired manner, and are provided with the opposed inwardly extending flanges 16 and 17 on their lower edges, as clearly illustrated in Figures 3 and 4 of the drawings.

Operating shafts 18 and 19 are mounted longitudinally of the hollow lift arms or members 14 and 15 in suitable bearings (not shown) in the ends 20 of said lift arms or members, and are provided with the offset laterally extending actuating handle bars or rods 21 and 22.

Inwardly extending apertured ears 23 and 24, and 25 and 26 are formed respectively at the opposite ends of the side tubular frame members 4 and 5, and support the hooked outer ends of the U-shaped connecting rods 27, whose inner ends are in turn attached to the apertured oppositely disposed laterally extending actuating arms 28 formed integrally with and adjacent the opposite ends of the operating shafts 18 and 19, whereby when the actuating handle bars or rods 21 and 22 are moved outwardly, the lift arms or members 14 and 15 will be moved along the front and rear tubular frame members 2 and 3 in a lateral direction toward the side tubular frame members 4 and 5, thereby opening or widening the space between said lift arms or members 14 and 15. Conversely, when the handle bars or rods 21 and 22 are moved inwardly toward each other, the lift arms or members 14 and 15 will be moved closer together, thereby causing a tire casing 29 when supported upon the lift arms or members 14 and 15 to be raised a slight distance in a vertical direction to align with the axle upon which the tire and its wheel will be mounted.

A plurality of axially aligned coacting sleeves 30, 31 and 32 will be disposed upon each side tubular frame member 4 and 5, and the centrally disposed sleeves 31 will be held in fixed position upon said members 4 and 5 by means of the set bolts 33 extending through the same and in contact with the said members 4 and 5.

The opposite ends of the sleeves 31 and the adjacent ends of the sleeves 30 and 32 will have their end portions cut off or stepped as at 34 to form spline connections between said sleeves.

A plurality of upstanding parallel disposed sockets 35 and 36 will be formed integrally upon the sleeves 30 and 32, to detachably and selectively support the tubular pipes or supports 37 and 38, which are adapted to extend upright at the opposite sides of the tire 29 to hold the same in upright position while being placed upon a truck after having previously been placed upon the lift arms or members 14 and 15.

Obviously, the plurality of sockets are provided for spacing the pipe supports 37 and 38 to accommodate various sizes and widths of tires and wheels. When using the device for removing dual wheels, the tubular supports 37 and 38 will be removed from the sockets 35 and 36, to permit the dual wheels to set firmly upon the machine without supports.

Inwardly extending pins 39 and 40 will be attached to the sleeves 30 and 32, and will be connected together by the coil springs 41 for normally and resiliently holding the sleeves 30, 31 and 32 in closely assembled relation.

In operation, the axle housing 42 of a truck (not shown) is elevated by means of the jack 43, and in removing the tire therefrom, the dolly type adjustable machine will be pushed along the ground until it underlies the tire 29 with the pipe supports 37 being disposed on the inner side of the tire and the pipe supports 38 being disposed on the outer side of the tire. The offset laterally extending actuating handle bars or rods 21 and 22 will then be moved inwardly to shorten the distance between the hollow lift arms or members 14 and 15, whereupon the securing means will be removed from the wheel and its tire and the tire with the wheel will be permitted to rest upon the said lift arms or members, whereupon actuating handle bars or rods 21 and 22 will be moved outwardly to lower the tire while it is being wheeled with the machine to the location where it will be repaired or worked upon.

In replacing the tire, it will be disposed upon the machine in a similar manner with the lift arms or members in their widest position, and with the pipe supports 37 and 38 arranged at the opposite sides of the tire. With the axle housing 42 of the truck elevated by means of the jack 43, the handle bars or rods 21 and 22 will then be moved inwardly to move the lift arms or members 14 and 15 near each other, thereby elevating the tire slightly so that it may be readily pushed upon the axle together with its supporting wheel.

It will therefore be seen that there has been devised and provided a highly efficient form of dolly type adjustable machine used in connection with supporting large sized heavy tires and wheels while mounting and demounting the same.

It will be further seen that by using the improved machine forming the subject matter of the instant invention, tires which are too large to handle normally by one mechanic may now be handled readily and mounted upon or demounted from a truck with a minimum of effort.

While the preferred embodiment of the instant invention has been illustrated and described, it will be understood that it is not intended to limit the scope of the invention thereto, as many minor changes in detail of construction may be resorted to without departure from the spirit of the invention.

Having thus described our invention what we claim as new and desire to secure by Letters Patent of the United States is:

1. A device of the character described comprising a portable wheel supported rectangular shaped frame member formed with parallel tubular side and end frame members, opposed pairs of tubular guide members slidably mounted on said end frame members, hollow lift arms disposed between said end frame members and connected with said tubular guide members, axially aligned socket supporting sleeves slidably mounted on said side frame members, tire positioning means supported in said sockets, and operating shafts extending longitudinally of said hollow lift arms being connected therewith for moving said lift arms or members toward and away from each other.

2. The subject matter as claimed in claim 1, and linkage connected between said operating shafts and said side frame members.

3. The subject matter as claimed in claim 1, linkage connected between said operating shafts and said side frame members, and offset actuating handle rods secured to the ends of said operating shafts for actuating the same.

4. The subject matter as claimed in claim 1, and resilient means connected with said axially aligned socket supporting sleeves for normally holding the same in coupled relation.

5. The subject matter as claimed in claim 1, means for fixing the central axially aligned socket supporting sleeves upon said side members, and means for adjusting said tire positioning means to accommodate various sizes of tires and wheels.

6. A dolly comprising a rectangular shaped frame body formed with parallel tubular side and end frame members, opposed pairs of tubular guide members slidably mounted on said end frame members, U-shaped lift arms secured between said end frame members and connected with said tubular guide members, operating shafts extending longitudinally of said U-shaped lift arms, linkage connecting said shafts and said side frame members and means secured to said shafts individually operating same towards and away from each other.

7. The combination of claim 6, wherein said linkage consists of axially aligned apertured ears and U-shaped connecting rods secured in said ears.

GEORGE H. RUSSELL.
WILLIAM D. MILLS.

REFERENCES CITED

The following references are of record in the file of this patent:

UNITED STATES PATENTS

| Number | Name | Date |
|---|---|---|
| 1,171,807 | Siberell | Feb. 15, 1916 |
| 1,374,986 | Carter | Apr. 19, 1921 |
| 1,570,070 | Lyman | Jan. 19, 1926 |
| 1,653,516 | Smith et al. | Dec. 20, 1927 |
| 2,364,918 | Roberson | Dec. 12, 1944 |
| 2,392,409 | Ray | Jan. 8, 1946 |